P. J. SMITH.
STEERING GEAR FOR MOTOR VEHICLES.
APPLICATION FILED MAY 11, 1916.
1,228,980.
Patented June 5, 1917.
2 SHEETS—SHEET 1.
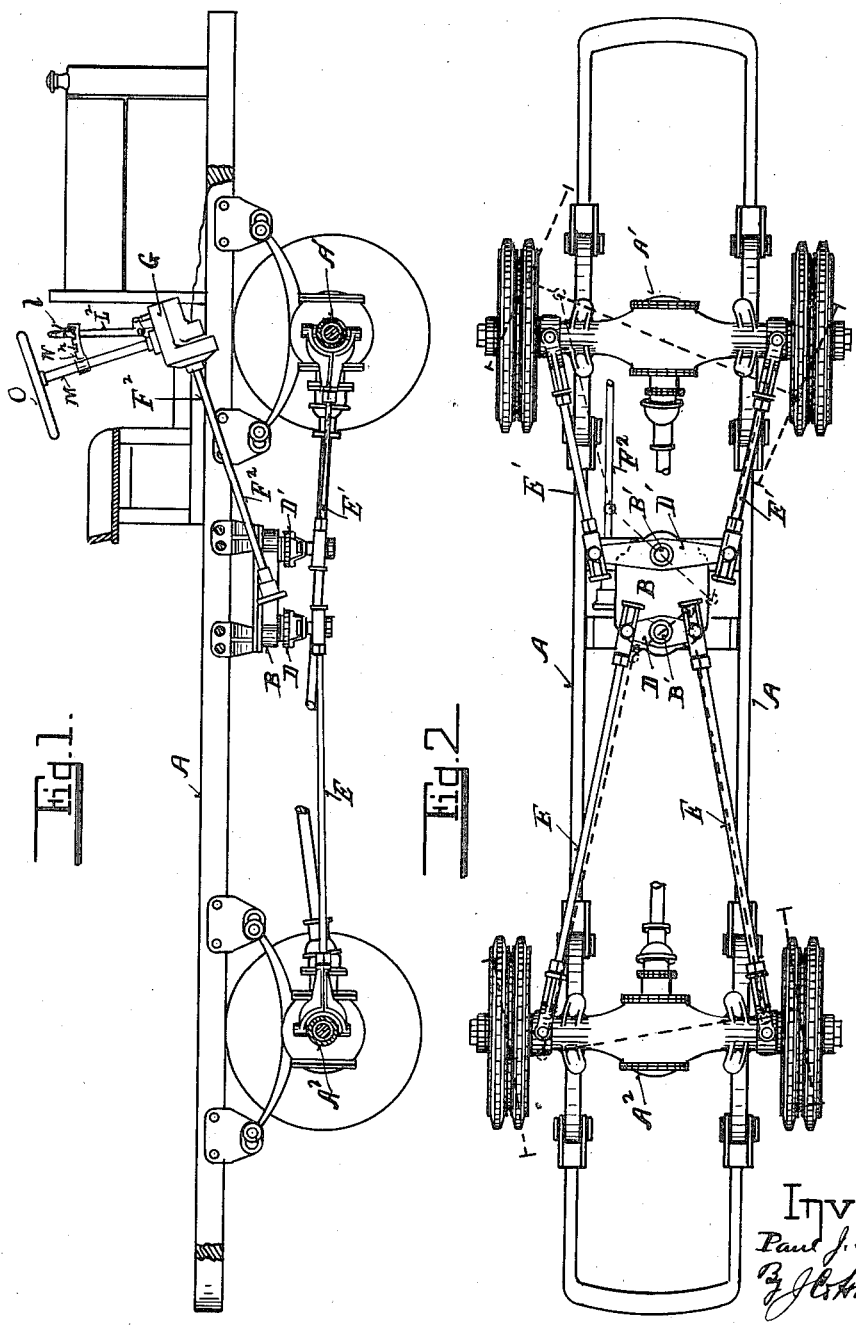
Inventor
Paul J. Smith

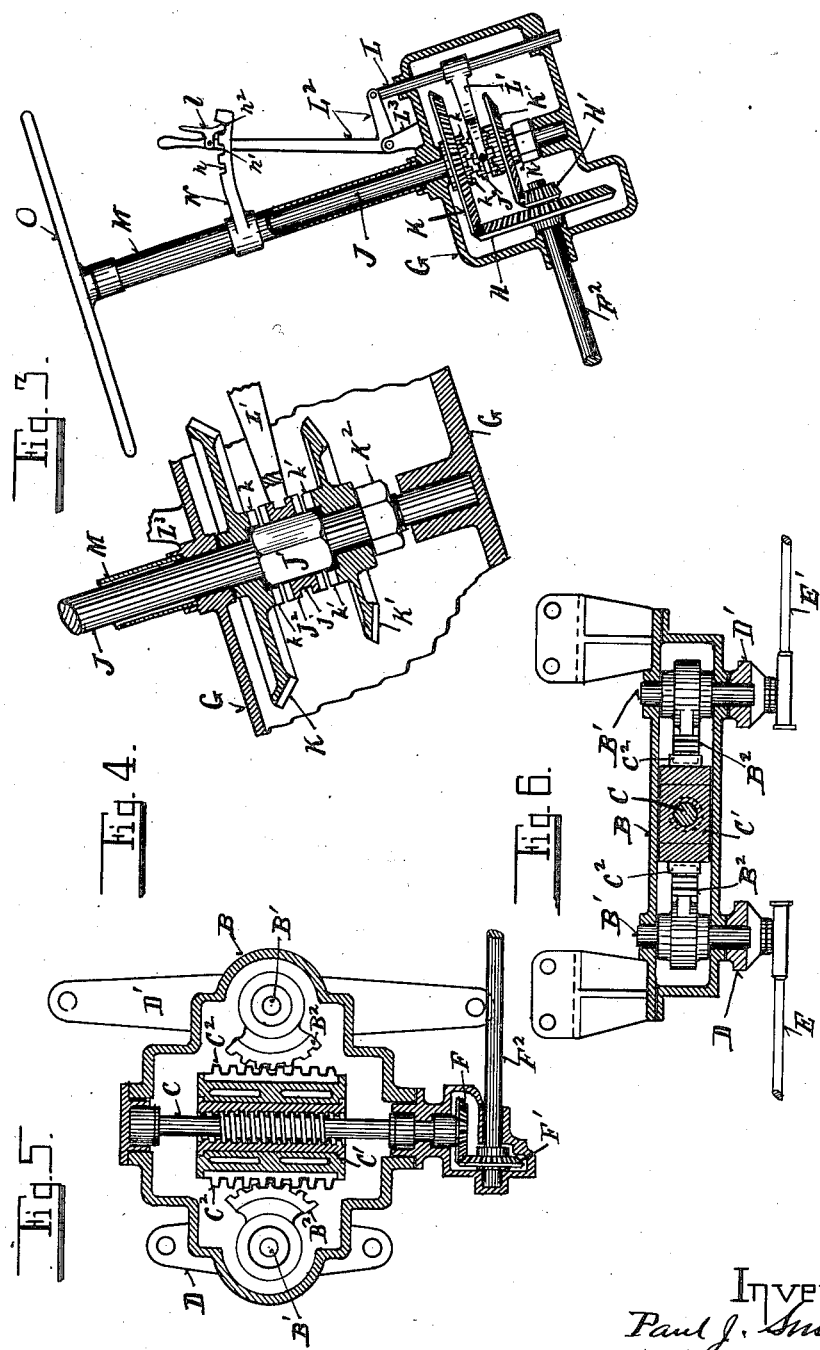

UNITED STATES PATENT OFFICE.

PAUL J. SMITH, OF BEECH CREEK, PENNSYLVANIA.

STEERING-GEAR FOR MOTOR-VEHICLES.

1,228,980.       Specification of Letters Patent.       Patented June 5, 1917.

Application filed May 11, 1916. Serial No. 96,910.

*To all whom it may concern:*

Be it known that I, PAUL J. SMITH, a citizen of the United States, residing at Beech Creek, in the county of Clinton and State of Pennsylvania, have invented certain new and useful Improvements in Steering-Gear for Motor-Vehicles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to motor vehicles, and has for its object the construction of steering gear therefor, adapted to operate the front and rear wheels for the purpose of giving direction to the motor vehicle.

The objects of my invention are to provide a gear shift mechanism for the steering gear, by means of which the speed of movement of the steering operation may be diminished when desired; and also to provide such steering gear with screw mechanism adapted to prevent shocks sustained by the wheels of the vehicle, from being transmitted through the steering gear, to the hands of the operator. These and other features of my invention will appear hereinafter and are illustrated in the accompanying drawings, in which:—

Figure 1, is a side view partially in elevation and partially in section, showing a motor vehicle provided with my improved steering gear.

Fig. 2, is a plan view of the underside thereof.

Fig. 3, is a detail partially in central section of the gear shifting mechanism.

Fig. 4, is an enlarged view of a portion thereof illustrating its construction.

Fig. 5, is a horizontal section of another portion of my improved steering gear.

Fig. 6, is a vertical central section of Fig. 5.

In these drawings A, indicates the body frame of a motor vehicle provided with front and rear steerable axles A', and A².

For the purpose of controlling the axles A' and A², I suspend to the frame A, a gear case B, in which are journaled vertical shafts B'; and secured upon the shafts B', within the gear case B, are spur gear segments B², B², as shown in Figs. 5 and 6 of the drawings.

Journaled in the gear case B, there is a transverse screw shaft C, upon which I place a nut C', which is adapted to travel horizontally on the screw shaft C, between the upper and lower walls of the gear case B, said upper and lower walls serving to prevent rotation of the nut C', as is shown in Fig. 6.

The nut C', is provided with rack bars C² C², which intermesh with the gear segments B² B². Upon the lower ends of the shafts B' B', I secure cross bars D and D'; and extending from each end of the cross bar D, to the end portions of the rear axle A², are bars E E; and extending from the ends of the cross bar D', to the end portions of the front axle A', are bars E' E'.

In carrying out my invention I prefer to make the bar D, shorter than the bar D', in order that the rear axle A², will not be turned to the same extent as the front axle A', as is shown by broken lines in Fig. 2. Experience has demonstrated that this is desirable.

For operating the screw shaft C, I secure thereon a miter gear F, which intermeshes with a like miter F', upon a shaft F², which extends forward to the steering transmission gear case G, as shown in Fig. 1. Within the gear case G, there is secured upon the shaft F², a miter gear H, having on the hub thereof a bevel gear H'. The steering shaft J, is journaled in the gear case G, (see Figs. 3 and 4) at right angles to the shaft F², and is provided with a square portion J', upon which a dental clutch ring J², is slidably mounted.

Upon the shaft J, above the square portion J', I place miter gear K, which intermeshes with the miter gear H, and which normally is free to rotate upon the shaft J. The hub of the miter gear K, is provided with teeth $k$, which are adapted to intermesh with the teeth upon the upper end of the dental clutch ring J², as hereinafter described. Upon the shaft J, below the square portion J', thereon, I mount a bevel gear wheel K', which intermeshes with the bevel gear H', on the shaft F², and the hub of the wheel K', is provided with teeth $k'$, which normally intermesh with the teeth on the lower side of the dental clutch ring J², as shown in Fig. 3.

The miter gear K, is prevented from moving longitudinally on the steering shaft J, by the wall of the gear case G, and the square portion J', on the shaft J, and the bevel gear K', is prevented from moving longitudinally on the shaft J, by the square portion J', and the nut K², as shown in Figs. 3 and 4.

For operating the clutch ring J², I provide a slide shaft L, which is mounted in the gear case G, and is provided with a forked arm L', which engages the slot j, in the clutch ring J². For operating the slide shaft L, I provide a lever L², which may be fulcrumed upon any suitable support, but I prefer to place the fulcrum L³ therefor, upon the gear case G, so that there will be no lost motion between the fulcrum L³, and the forked arm L'.

Upon the steering post M, the lower end of which is secured to the gear case G, and within which the steering shaft J, operates, I secure a short segment bar N, which is provided with notches n, n' n²; and the lever L², is provided with a latch mechanism l, which is adapted to enter the desired notch n; thus, when the latch l, is in the notch n², the bevel gear wheel K', will be engaged by the dental clutch ring J² (which is the normal steering gear), but if the lever L², is moved so that the latch l, thereon, will enter the notch n, the clutch ring J², will be raised out of engagement of the bevel gear wheel K', and into engagement with the miter gear K, which will greatly decrease the speed of operation of the steering gear, and likewise decrease the amount of power necessary to be exerted upon the hand wheel O, by the operator.

When the latch l, is placed in the notch n', the clutch ring J², will be out of engagement with either of the gears K, or K'.

In operation, when the vehicle provided with my improved steering gear herein shown and described is traveling over a good road, the normal position of the gears is as shown in Fig. 3, with the bevel gear K', intermeshing with the bevel gear H', in which the driven shaft F², will be caused to rotate much faster than the steering shaft J; when, however, the vehicle is without motion, and it becomes necessary to turn the axles, as shown in Fig. 2, before giving motion to the vehicle, in order to turn quickly away from a curb, as for instance, when there are other vehicles standing immediately in front and behind, the lever L², may be operated to place the clutch ring J², in engagement of the teeth k, upon the miter gear K, which intermeshing with the miter gear H, the said two miter gears being of equal size, will reduce the speed of the driven shaft F², to the speed of the steering shaft J, thereby increasing the power of the hand wheel O.

When the driven shaft F², is caused to rotate by the operation of the hand wheel O, as hereinbefore described, the screw shaft C, will force the nut C', laterally with reference to the vertical shafts B', which lateral movement will, through the segments B², cause said shafts B', to rotate in opposite directions, thereby swinging the bars D and D', as indicated by broken lines in Fig. 2, which movement of the bars D and D', is communicated to the front and rear axles, as hereinafter described.

Having thus fully shown and described the mechanism embodying my invention so as to enable others to construct and utilize the same, I do not desire to be limited to the exact construction and arrangement of mechanism herein shown and described, but what I desire to secure by Letters-Patent is:—

1. The combination in a motor vehicle, of a body frame, a pair of steerable wheels thereunder, a transversely movable rack-bar supported by said body frame, screw and nut mechanism for controlling said rack-bar, a vertical shaft, a gear segment mounted on said vertical shaft and intermeshing with said rack-bar, a transverse bar centrally secured on said vertical shaft, bars pivoted at the ends of said transverse bar and adapted to control said steerable wheels, and hand wheel-shaft and gear mechanism adapted to operate said screw-and-nut mechanism, substantially as set forth.

2. The combination in a motor vehicle of a body frame, a pair of steerable wheels thereunder, a transversely movable rack-bar supported by said body frame, screw-shaft and nut mechanism for controlling said rack-bar, a vertical shaft, a gear segment mounted on said vertical shaft and intermeshing with said rack-bar, a transverse bar intermediately secured on said vertical shaft, bars pivoted at the ends of said transverse bar and adapted to control said steerable wheels, a steering shaft, a driven-shaft, intermeshing miter-gears on said steering and driven shafts, and intermeshing miter-gears on said driven shaft and said screw-shaft, substantially as set forth.

3. The combination in a motor vehicle steering gear, of a steering shaft, a pair of miter-gears loosely mounted on said steering shaft, clutch mechanism on said shaft between said gears adapted to alternately engage said gears, a shaft adapted to be driven thereby, a pair of miter gears of different diameters secured on said driven shaft intermeshing with the miter gears on said steering shaft, and lever and slide mechanism to operate said clutch mechanism, substantially as set forth.

4. The combination in a motor vehicle steering gear, of a steering shaft, a hand wheel secured thereon, a pair of gear wheels of different diameters rotatably secured on said shaft, a clutch ring slidably and non-rotatably secured on said shaft between said gears, a driven shaft, a pair of gear wheels of different diameters non-rotatably secured on said driven shaft and adapted to intermesh with the gears on said steering shaft, and means to slide said clutch ring, substantially as set forth.

5. The combination in a motor vehicle steering gear, of a steering shaft, a hand wheel secured thereon, a miter-gear wheel rotatably secured on said shaft, clutch teeth on the hub of said wheel, a clutch-ring slidably and non-rotatably secured on said shaft, clutch teeth on each end thereof, a bevel gear of less diameter than said miter-gear rotatably secured on said steering shaft under said clutch-ring, clutch teeth on the hub of said bevel gear, a driven shaft, a miter-gear non-rotatably secured thereon and intermeshing with the miter-gear on said steering shaft, a bevel gear pinion non-rotatably secured on said driven shaft and intermeshing with the bevel gear on said steering shaft, and means to slide said clutch-ring on said steering shaft between the gears thereon, substantially as set forth.

In testimony whereof I affix my signature.

PAUL J. SMITH.